United States Patent [19]
Fleming

[11] 3,826,874
[45] July 30, 1974

[54] METHOD AND APPARATUS FOR EFFECTING JUMP HUNTING IN STEP-BY-STEP TELEPHONE SWITCHING SYSTEMS

[75] Inventor: James Evans Fleming, Fairfax, Va.

[73] Assignee: Air Land Systems, Fairfax, Va.

[22] Filed: Apr. 19, 1973

[21] Appl. No.: 352,751

[52] U.S. Cl. .......................................... 179/18 HA
[51] Int. Cl. .......................................... H04q 3/62
[58] Field of Search ........ 179/18 HA, 18 H, 18 EA, 179/18 C, 18 AB, 18 FF; 340/147 G; 178/3

[56] References Cited

UNITED STATES PATENTS

| | | | |
|---|---|---|---|
| 2,602,122 | 7/1952 | Lesigne | 179/18 HA |
| 2,717,924 | 9/1955 | Gohorel | 179/18 HA |
| 3,221,107 | 11/1965 | Seemann et al. | 179/18 HA |
| 3,283,081 | 11/1966 | Basset et al. | 179/18 HA |
| 3,519,755 | 7/1970 | Allum et al. | 179/18 HA |
| 3,536,844 | 10/1970 | Anderson, Jr. | 179/18 HA |
| 3,723,659 | 3/1973 | Budrys et al. | 179/18 HA |

*Primary Examiner*—Thomas A. Robinson
*Attorney, Agent, or Firm*—Cantor & Kraft

[57] ABSTRACT

A novel apparatus is disclosed by which the hunting capabilities of a connector in a step-by-step telephone switching system is greatly expanded, the step-by-step telephone switching system being of the type wherein a call is progressively routed by dial pulses from an electro-mechanical line finder or an incoming trunk through selector stepping apparatus of an exchange into a group of electro-mechanical stepping switches constituting the connector to which is coupled a group of subscriber lines, the position of the connector switch brush on the terminals being determined by the dial pulses to effect a connection between a line of the calling and a line of the called subscriber. The apparatus of the instant invention comprises intercept means which serves to intercept the call at the connector switch terminal and release the switch, re-dialer means for automatically generating dial pulses representative of a different subscriber line terminal on the connector switch, and means for effecting reconnection of the calling line to the brush, thus connecting the call to a different subscriber line through the connector switch. By means of the apparatus disclosed herein, an individual business or residence telephone line can become the directory number of a small hunting group in a step-by-step switching system, even though the telephone numbers consecutive to the individual line directory number are not available for use in the hunting group. Also, a sub-group of numbers may be added to a hunting group without requiring the added numbers to be consecutive to the numbers of the lines in the original hunting group.

13 Claims, 6 Drawing Figures

METHOD AND APPARATUS FOR EFFECTING JUMP HUNTING IN STEP-BY-STEP TELEPHONE SWITCHING SYSTEMS

BACKGROUND OF THE INVENTION

This invention generally relates to automatic telephone switching systems and exchanges and particularly concerns an improvement therein specifically adapted for use in step-by-step switching systems whereby one or more non-consecutive lines can be added to existing hunting groups in such systems whereby a number of lines are reached through a single directory number.

In existing automatic telephone switching systems and exchanges, subscribers are frequently offered the service whereby they are assigned a plurality of lines for incoming or outgoing calls, yet only a single directory number is listed in the telephone directory. Upon completion of a call made to the directory number, that directory number at the subscriber location will ring if it is not busy. If the directory number is busy, the telephone switching equipment effects an automaic hunt for an idle line among the pluraliy of lines assigned to the subscriber under this number. If an idle line in the group or plurality of lines assigned to the subscriber is found, the call is completed to that line. If no idle line is found in the group, a busy tone is placed on the calling line. This type of service is well-known and recognized in the art under the designation of "line hunting" service.

Virtually all existing automatic telephone switching systems are capable of effecting such a "hunting" through various groups of subscriber lines. The particular type of hunting that can be effected greatly varies, however, as between the different automatic switching systems.

For example, relatively recently developed automatic telephone switching systems are primarily of the common control type, as contrasted to the step-by-step type, these common control types registering the dialed digits representative of the called subscriber's line and using common controls to test for a busy condition or an idle condition of the called subscriber's line, to select paths through the overall network, and to establish the requisite connections between the calling line and the called subscriber's line. Typical of such known systems are those designated as Number 1 and Number 5 crossbar systems serving large offices and private branch exchanges, and Number 1 ESS systems, as well as other electronic systems.

These systems have the capability of "jump hunting," i.e., hunting from a given number to a non-consecutive number in an automatic fashion.

For example, assume that a particular subscriber is given the directory number of XXX-1000 and, in addition, the subscriber has telephone lines numbered XXX-1010, XXX-1015, XXX-1099, i.e., numbers that are not in consecutive sequence with the assigned directory number. With the "jump hunting" capabilities of modern common controlled switching systems, an incoming call placed to the assigned directory number of the called subscriber, XXX-1000, will reach such assigned number if same is not busy. However, if the assigned number is busy, the common control type automatic telephone switching equipment is capable of completing the call to any one of the other consecutive or non-consecutive numbers assigned to the called subscriber that may be idle. Thus, in this instance, the subscriber would have a non-consecutive numbered hunting group, commonly called a "jump hunting" group.

This far-reaching capability of "jump hunting" is not available in many of the older automatic telephone switching systems, particularly those of the electro-mechanical step-by-step variety wherein an incoming call is progressively routed by dial pulses from an electro-mechanical line finder or incoming trunk through selector stepping apparatus of an exchange into a group of electro-mechanical stepping switches constituting a connector to which is coupled a group of subscriber lines, the position of the connector switch brush on the switch terminals being determined by the dial pulses to effect a connection between a line of the calling subscriber and the line of the called subscriber. With such systems, the connector switch can be wired to effect "hunting" through the self-stepping capabilities of the switch per se. However, these systems are strictly limited to hunting groups containing consecutively numbered subscriber lines.

For example, assume once again that the subscriber has an assigned directory number of XXX-1000 and desires "hunting" service. This requires the assignement to the subscriber of additional lines that are numbered in consecutive sequence to the assigned directory number, i.e., XXX-1001, XXX-1002, etc. This requirement arises due to the fact that the hunting capabilities of these step-by-step switching systems are limited by the capabilities of the final electro-mechanical stepping switch. In this respect, and as explained above, a plurality of subscriber lines are served by each group of connector switches, the contacts to such subscriber lines being physically disposed in a two-dimensional arrangement. The brush of the connector switch is driven to a level in one direction by the penultimate digit of the called number, for example, and the last digit steps the brush of the connector in the other direction to a particular terminal within the previously selected level. When such connectors are wired for "hunting" service, if the called number is busy, the brush of the connector switch automatically steps past the terminal of the called number to the next terminal in the sequence and so forth, until an idle line is found. Details of this operation will be explained hereinbelow.

Suffice it to say that with such step-by-step switching systems and their associated limitation of hunting only in consecutive numbers, conditions arise where service cannot be provided to numerous subscribers as desired. For example, if a given subscriber is assigned a directory number of XXX-1000 and the next number in sequence, i.e., XXX-1001, is assigned to a different party, "hunting" capabilities cannot be provided the first subscriber, unless the subscriber changes his assigned directory number so that it would precede one or more vacant numbers. Changing of an assigned directory number is an inconvenience for a residential subscriber, and it can be seriously detrimental to a business subscriber.

Accordingly, telephone subscribers who are served through step-by-step electro-mechanical switching systems and who desire a hunting group of lines may be seriously inconvenienced and penalized as compared with those subscribers who are served through more modern common control equipments. To date, little has been done to expand the hunting capabilities of the older step-by-step switching systems and the subscribers thereto generally must wait for more modern telephone switching equipment to be installed before they can get the advantages of non-consecutive group hunting service.

The disadvantages experienced by the subscribers served by such step-by-step telephone switching systems can be alleviated only if the telephone companies accept economic losses. Specifically, telephone companies utilizing step-by-step equipment may reserve a group of numbers that are consecutive to the numbers of a hunting group assigned to a subscriber, so as to accommodate growth in the hunting group. This accommodation to the original subscriber is costly to the telephone companies in that the unassigned though reserved numbers do not produce revenue. In recent years, there has been an increasing degree of encroachment on such reserved numbers by the telephone companies so as to increase the telephone companies' revenues and so as to achieve more nearly 100 percent usage of the switching system capabilities. Therefore, it is frequently the occurrence that when additional lines are needed in a hunting group, the required consecutive numbers are not available, and the customer is inconvenienced with a resulting loss of good will.

The problem is further aggravated recently in that there has been a rapidly growing use of so-called "key systems" in which a number of telephone stations are served by a smaller number of lines, each station having access to each line by means of keys on the station set. The lines to a customer key system may also be placed in a hunting group and reached by a single directory number so that a call to that directory number can be completed if any line in the group is idle, and any station can be connected to the line by the depression of a key on the set. The very large number of small hunting groups consisting of several lines which exist within such key systems make it practically impossible to reserve adequate numbers to allow for growth, and the possibility of expansion of small consecutive hunting groups in this class, without a directory number change, is remote.

SUMMARY OF THE INVENTION

From the above discussion, it is clearly apparent that a need exists wherein jump hunting capabilites can be provided in a step-by-step switching system whereby a call can be transferred and completed to non-consecutive auxiliary lines assigned to the subscriber if the assigned directory number is busy. It is the principal object of this invention to provide the apparatus necessary to achieve this desired jump hunting capability, in existing step-by-step switching systems.

It is a further object of the instant invention to provide apparatus and a technique directed to step-by-step switching systems whereby one or more non-consecutive lines can be added to a key system hunting group at a reasonable cost.

It is yet another objective of the instant invention to provide an apparatus and a technique in a step-by-step system whereby an individual business or residence telephone line can become the directory number of a small hunting group even though the numbers consecutive to the individual line directory number are not available for use in the hunting group.

It is yet another objective of the instant invention to provide apparatus and a method applicable to step-by-step telephone switching systems whereby a set of consecutive or non-consecutive numbers may be added to an existing hunting group, even though the first number of the added set is not consecutive to the last number of the existing hunting group.

It is an overall objective of the instant invention to provide the apparatus and means whereby the hunting capabilities of existing step-by-step telephone switching systems can be greatly expanded, at low cost, so as to give better service to the subscriber until such time as common control equipment can be installed.

These objectives, as well as others which will become apparent as the description proceeds, are implemented by the subject invention which, as aforestated, has applicability to existing step-by-step telephone switching systems of the type wherein a call is progressively routed by dial pulses from an electro-mechanical line finder or incoming trunk through selector stepping apparatus of an exchange into an electro-mechanical connector, to which connector is coupled a group of subscriber lines, the position of the connector switch brush on the line terminals being determined by the dial pulses to effect a connection between a calling line and the line of the called subscriber.

From a generalized standpoint, the instant invention will be seen to comprise means which intercept the call at the connector switch input, holds the calling line connection, and restores the switch to normal; re-dialer means which automatically generates dial pulses representative of a different subscriber line of the group of lines on the connector switch; and means for thereafter effecting re-connection of the calling line to the different subscriber line as re-dialed, through the same connector switch.

From the standpoint of internal operation, the equipment to which the instant invention is directed carries out a technique whereby the presence of an incoming call directed to the directory number of the group of lines served by the connector switch is initially detected. The incoming call is then electrically disconnected from the connector switch, thus restoring the switch to normal while the incoming call is still held in the preceding switching equipment. The position of the brush of the connector switch is then changed to a new position representative of a selected predetermined different subscriber line of the group of lines by re-dialing into the connector switch, and finally, the calling line is re-connected to the connector switch and hence to the different subscriber line.

The equipment necessary for effecting this operation is relatively simple in nature and constitutes an auxiliary device or addition to existing step-by-step systems, the auxiliary equipment being constituted of well-known and available telephone switching and computer-type apparatus as will be explained more fully hereinafter.

BRIEF DESCRIPTION OF THE DRAWINGS

The invention itself will be better understood, and additional features and advantages thereof will become apparent, from the following detailed description of a preferred, though exemplary, inventive embodiment, such description making reference to the appended sheets of drawings, wherein.

DETAILED DESCRIPTION OF A PREFERRED INVENTIVE EMBODIMENT

Figure 1:
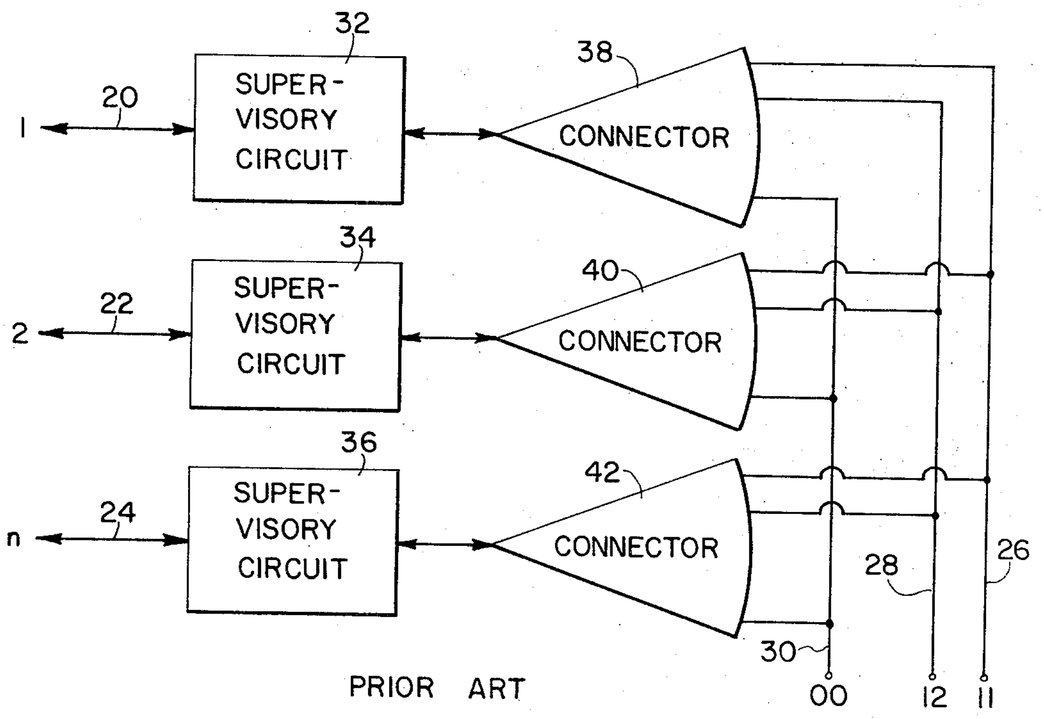
FIG. 1 is a schematic illustration of the final switching stages of an existing prior art step-by-step telephone switching system.

Referring now to FIG. 1 of the drawings, a connector of existing step-by-step systems is illustrated and consists of a group of step-by-step switches 38, 40 and 42, typically 10 in number but varying from about seven to 14, depending on the calling rate of the lines served by the group. The connector group serves approximately 100 subscriber lines, each line having an appearance on each connector as shown in FIG. 1. Associated with each connector switch is a supervisory relay circuit designated by reference numerals 32, 34 and 36. The input to each connector switch is a link, such as 20, 22 and 24 of FIG. 1, each coming from a separate selector switch of the step-by-step switching train. There are three wires, tip, ring and sleeve, for each line, switched through the selector, which three wires are represented by a single line in FIG. 1 for illustrative simplicity.

Any call, such as a call appearing on link 20 for example, can be switched by dial pulses on the tip and ring wires associated therewith to any one of the group of subscriber lines served by the connector. The call is supervised by the relay circuit 32 and the brush of the connector switch is restored to "normal" at the end of the call. While the conversation is in progress, another call appearing on link 22 or 24 can be connected to any idle line in the subscriber group through a different connector of the group and served in like manner. Thus, any idle link is connectable to any idle subscriber line and the maximum number of simultaneous calls in the group is equal to the number of connector switches provided.

Figure 2:
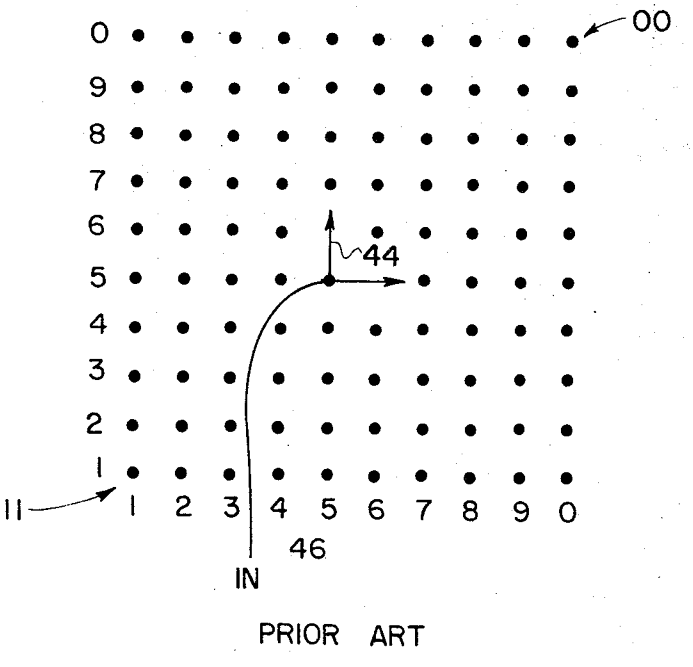
FIG. 2 is a schematic diagram of the terminal array of a typical existing connector switch utilized in step-by-step exchanges.

Reference now being made to FIG. 2, therein illustrated is the terminal bank of each of the connectors 38, 40 and 42 arranged in a two-dimensional grid or array as is conventional. The switch mechanism of each connector is capable of moving one step at a time under control of a ratchet drive, which ratchet may be driven by dial pulses in one mode or by self-generated pulses in another mode as is known. When the connector switch is driven by self-generated pulses, it is said to be "hunting" and will pass over busy terminals of the subscriber group and stop on the first idle terminal it reaches. There is a ratchet drive for each of the two directions shown in FIG. 2. The busy/idle condition of a given terminal is detected by the sleeve lead of the brush. The connector brush is stopped in the direction of increasing numbers, and is held by the ratchet against gravity or against a spring. It may be returned to normal in one motion by release of the ratchet pawl. Since the detailed construction of such connector switches is conventional, further description thereof is not necessary for an understanding of the invention.

With the foregoing review of the structure of a conventional step-by-step switching system now in mind, a description of typical operation thereof follows. Let it be assumed that a call on incoming link 20 has been dialed to be directed to outgoing subscriber line 30 in FIG. 1. It should be noted that the number or digits associated with subscriber line 30 is designated as "00." As such, subscriber line 30 might possibly have a directory number of XXX-1100. The first five digits of the number, i.e., XXX-11, have previously set selector stepping apparatus (non-illustrated) of the step-by-step exchange as the call was progressively routed through the switching system to, at this point, appear on incoming link 20. Thus, the lines on connector 38 are all the lines having XXX-11 as the first five digits of its directory number. All that remains for selection are the last two digits of the number, i.e., "00," which selection is effected through operation of the electro-mechanical connector switch 38, the position of the connector switch brush being determined by the dial pulses representative of the last two digits "00" so as to effect a connection between the call on link 20, and line 30 of the called subscriber. Each of the conventional supervisory circuits 32, 34 and 36 associated with a respective connector of the connector group performs the many different functions of supervising a call through its associated connector. For example, the functions of supervisory circuit 32 as well as the other supervisory circuits include battery feed to the calling and called station sets, ringing the called party, sending audible ringing to the calling party, trip-ringing on answer, cut-through for a voice frequency path between the two parties, start and stop timing for charging purposes, supervising the connections for the called and calling parties, disconnecting and restoration of switches to normal on abandonment of a call or at the end of a conversation when the handsets go on-hook, and furnishing busy tones when the called line is busy and the call cannot be completed.

Reference is again made to FIG. 2 of the appended drawings, wherein the terminal arrangement of a typical connector switch, such as connectors 38, 40 and 42, has been schematically illustrated, a group of subscriber lines representative of lines having the first two digits of "11" being coupled to the respective terminals of the terminal bank.

Assuming, for example, that the last two digits of the called number that will be switched by the connector illustrated in FIG. 2 is "00," the brush 44 of the connector would first move vertically to the upper left-hand corner of the contact grid, for example, the vertical movement of the connector brush being effected by the first "0" of the number "00." The last digit, i.e., "0" of the number "00" serves to move the brush 44 of the illusrated connector to the far right-hand corner of the grid, i.e., tenth level, tenth row, whereat a final connection is made to the called subscriber's line. Subsequent supervisory functions associated with a call completion and supervision are handled by the supervisory circuit such as 32 associated with this particular connector switch.

If the connector illustrated in FIG. 2 were wired to effect "hunting" operation, the following changes in operation would occur, as is conventional. First, let it be assumed that the "hunting group" among the plurality or group of subscriber lines served by the connector is designated by the final two digits "80 through 84." In this instance, the assigned directory number of the subscriber having this hunting service would be "XXX-XX80." When a call designated by the requisite dial pulses of the assigned directory number appears on incoming link 46 of the connector, the brush 44 of the connector would first be raised to the eighth level on the terminal bank, and, at the eighth level, would be stepped to the tenth or "zero" position, this position corresponding to the subscriber line having the final two digits of "80." If this line is busy, as sensed by the brush on the sleeve, the pawl will be released, allowing the brush to spring back to normal, and it would then advance to terminal 1 which is the position of the subscriber line having the last two digits "81." If this line, too, is busy, the brush 44 would advance to still another consecutive number, i.e., "82," and so forth. Importantly, the hunting capabilities of this type of connector switch are quite limited in that only consecutive numbers can be assigned to any one hunting group.

All of the above-described apparatus are typical and in use with conventional step-by-step telephone switching systems. Such circuits for performing these functions have been in existence for in excess of 60 years and have undergone practically no change in the last three decades. Such circuits and related apparatus are therefore extremely well-known in the art in many optional forms thereof and further description of such circuits herein is not deemed necessary.

Figure 3:
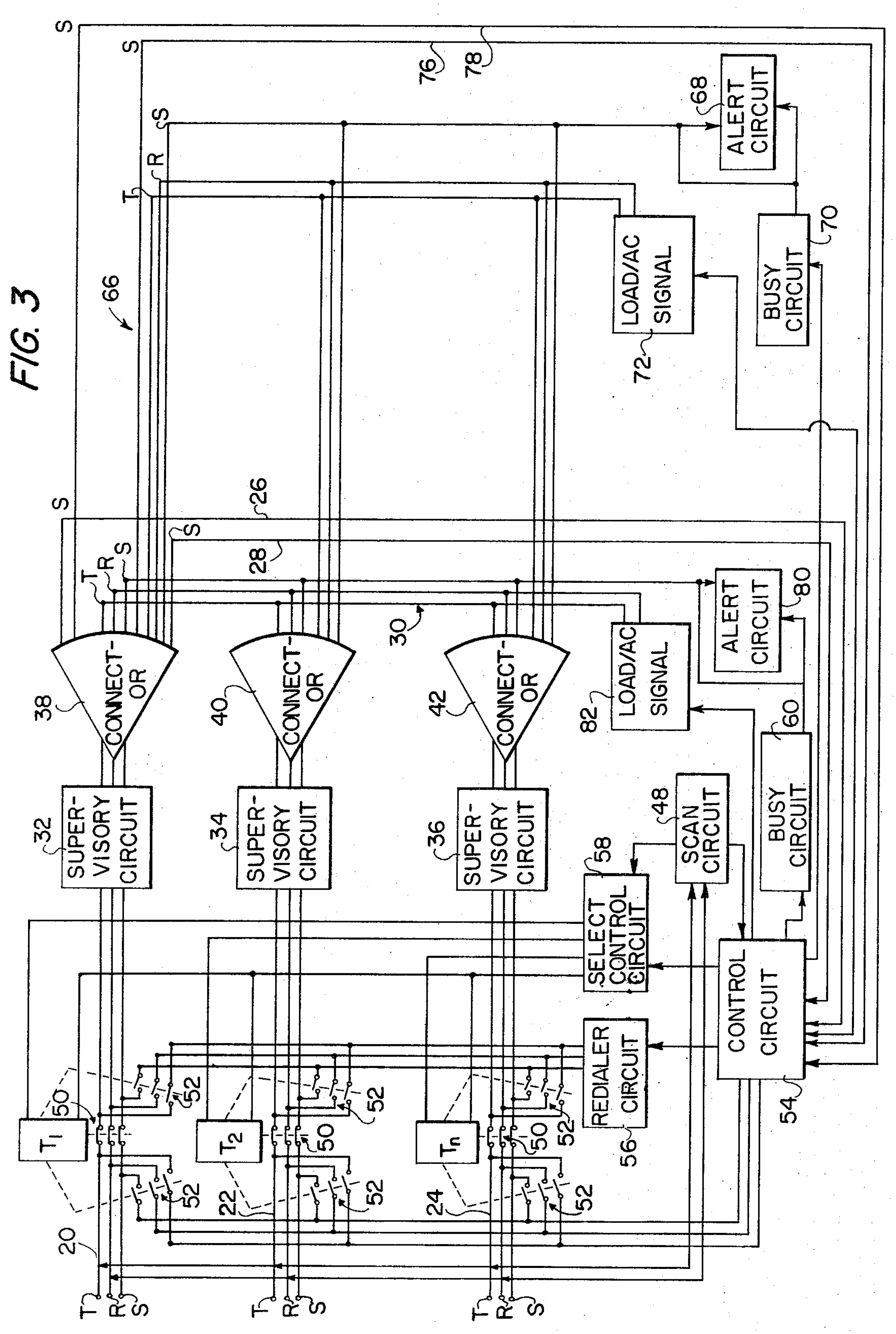
FIG. 3 is an electrical schematic block diagram of the apparatus of the instant invention utilized to increase and expand the hunting capabilities of the connector of existing step-by-step telephone switching systems, the embodiment of the invention represented therein being particularly suited for commercial use.

Attention is now directed to FIG. 3 of the appended drawings, wherein an electrical block schematic diagram of the novel invention is illustrated associated with a conventional step-by-step connector group of the type shown in FIG. 1, the apparatus of the instant invention enabling "jump hunting" to take place, i.e., enabling hunting between non-consecutive numbers on the terminal bank of the connector. Elements of the system of FIG. 3 equivalent to those depicted in FIG. 1 are designated by the same reference numerals.

From the standpoint of overall operation, the novel inventive apparatus as depicted in FIG. 3 serves to intercept a call directed to a particular subscriber line at the connector switch before connection is made between the link of the call and the line of the called subscriber. The tip, ring and sleeve of the directory number are disconnected from the line permanently and are extended to the controls of the inventive system, which system re-routes the call to another subscriber line in the connector group. This different subscriber line need not be a line having a number consecutive to the originally called directory number. Thus, through the utilization of the additional apparatus of the instant invention in association with existing step-by-step connectors, "jump hunting" can readily be effected.

In FIG. 3, and as explained above, representative links 20, 22 and 24 are, in practice, composed of three conductors as is conventional, these conductors constituting the so-called "tip," "ring," and "sleeve" leads designated by the alphabetical letters T, R, and S, respectively, each of the leads of a link being connected to a conventional supervisory circuit 32, 34 and 36 associated respectively therewith and with connector switches 38, 40 and 42, each connector switch having a plurality of subscriber lines coupled thereto, such as lines 26, 28 and 30, each line having the same terminal number on all connector switches.

The tip, ring and sleeve leads 30 of the directory number which will be made a part of a "jump hunting" group are shown as are the sleeve leads 26 and 28 of two auxiliary lines that are to combine with the directory number to form the hunting group created by the invention.

The tip, ring and sleeve leads of the hunting group directory number line 30 are disconnected from the telephone line and connected to the controls of the inventive system. The sleeve lead is connected to alerting circuit 80, which detects the presence of a call when the connector brush grounds the sleeve lead as will be explained. The tip and ring leads of line 30 are connected to load 82. The sleeve leads 26 and 28 of the auxiliary lines are extended to control box 54 so that the busy/idle status of these lines can be determined at the control box at all times, all as will be explained more fully hereinbelow.

Assume, now, that an incoming call exists on link 20 for ultimate connection through supervisory circuits 32 and the connector 38 to the subscriber line designated by reference numeral 30, this line number being the directory number of the jump hunting group created by the invention. The apparatus of the instant invention must first sense the occurrence of the call for line 30 at the connector group. It is for this reason that a detecting means designated by reference numeral 80 and constituting an "alert" circuit is provided and is coupled to line 30, alerting circuit 80 specifically operating to detect the occurrence of a ground on the sleeve lead of the multiple of line 30. The presence of a call requiring "jump hunting" is therefore noted.

Under control of circuit 54, a temporary load such as a resistive bridge is placed across the tip and ring of the multiple of called line 30 for a short interval of time and then removed by the loading circuit 82. The placement of the load across the tip and ring of the subscriber line multiple 30 simulates an answer by the called party, causing supervisory circuit 32 to disconnect ringing of the called telephone, remove audible ringing from this calling party line, and cut the call through from link 20 to line 30. While the call will be recognized as being answered for purposes of this invention, the removal of the temporary load occurs before the supervisory circuit 32 starts timing for charging purposes, or start of timing for charging is prevented by other circuit means.

The apparatus of the instant invention, while now recognizing the occurrence of a call for subscriber line 30, has not yet ascertained through which of the plurality of incoming links 20, 22 and 24 the call appeared. So as to make this determination, control circuit 54 through loading circuit 82 further applies a superaudible high-frequency alternating current signal across the tip and ring leads of line 30, this signal not being audible to the calling party. This signal will appear across the tip and ring of the incoming link, 20 in this instance, and not across any of the other incoming links 22 or 24 since the only completed talk path which exists at this point is between incoming link 20, i.e., the calling line, and outgoing subscriber line 30 through connector 38. The tip and ring pairs of the incoming links are scanned sequentially by a scanning circuit means 48 under control of circuit 54 so as to determine on which incoming link the superaudible a.c. signal appears. The scanning will find the superaudible signal only on incoming link 20, and this identifies link 20 and associated connector 38 as the path through which the call arrived.

Upon identification of link 20 as above-described, the apparatus of the instant invention thereafter operates to intercept the detected call on incoming link 20, transfer control of the call to control circuit 54 to maintain proper supervision of the calling connection, and subsequently to redirect the call to another subscriber line of the jump hunting group, such as auxiliary line 26 or 28. To effect this re-routing, a plurality of relay switching mechanisms, such as relays $T_1$, $T_2$, and $T_n$ are provided. Each of these relays is associated with a respective one of the incoming links 20, 22 and 24, as shown, and incorporates contacts 50 which are normally closed as well as contacts 52 which are normally open. When a particular relay is not energized, there is no effect on the link of the incoming call in that a complete electrical path exists through normally closed contacts 50 into the associated supervisory and control circuits and connector switches coupled thereto. When a particular relay T is energized, this direct path of the link of the incoming call to the supervisory and control circuit and associated connector is broken and a path is effected by closure of contacts 52 such that the calling line is routed through the control means 54 and the connector brush leads are switched to a re-dialer means 56, as will be discussed hereinbelow.

Thus, in this instance, scanning means 48 has determined that the call on subscriber line 30 originated on incoming link 20. Upon identification of link 20, select-/control means 58 serves to energize relay $T_1$ associated with incoming link 20 so as to open contacts 50 to disconnect link 20 from connector 38, and close contacts 52 to establish the re-routing of the incoming call to control means 54, and the brush inputs to redialer means 56.

The condition, i.e., busy/idle, of each of the auxiliary lines 26 and 28, for example, is interrogated through tests of the respective sleeve leads for a grounded condition by means 54 and an idle line is selected, such as line 76. Re-dialer 56, a conventional apparatus, thereafter is wired to dial the last two digits corresponding to the terminal of the available auxiliary subscriber line on the connector switch 38. By so dialing the last two digits, the brush of connector 38 is moved to a different position on its associated grid-like terminal bank so as to connect into auxiliary line 76. Relay $T_1$ is then released, thus connecting the calling line to line 76. The call thereafter is handled in normal and conventional fashion by the existing telephone switching equipment, particularly by the existing supervisory control circuit 32 which initiates the ringing cycle and commences a normal call sequence. All of the jump hunting circuits are restored to a normal idle state ready to receive the next jump hunting call. Importantly, all subsequent events are controlled and supervised by the existing equipment exactly as it would have been if the calling party had directly dialed the assigned number of the auxiliary subscriber line.

If all of the auxiliary lines assigned to the subscriber were "busy," this "busy" condition would have been detected by a busy circuit means 60 of conventional construction and a normal busy signal sent to the calling party on link 20 under control of circuit 32. Specifically, busy circuit 60 would serve to place a ground on the sleeve lead of the line 30 and would inhibit the alerting circuit 80 from initiating a false start of the jump hunting process. The brush of the connector would then encounter a busy condition on the terminal for line 30 which causes it to return a busy signal in a conventional fashion to the calling party. This ground is removed when any idle line in the jump hunting group, such as lines 26 and 28, becomes idle.

If the call is abandoned during the process just described, by virtue of the calling party hanging up, supervisory circuit 32 drops the connections in the step-by-step network and restores the switches to normal.

To summarize the above sequence of events, so as to gain a better understanding of the manner in which "jump hunting" is effected on the existing step-by-step connector, the presence of an incoming call directed to a given directory number of a line of the group of lines at the terminals of a connector switch was first detected. The call was "answered" by the inventive controls and an audio path established through the switch. The connector switch was identified. The calling line was disconnected from the connector switch and held by the inventive control circuit. The connector switch was thereafter re-dialed to a position representative of a selected predetermined different subscriber line of the group of lines and, finally, the calling line was thereafter re-connected to the re-dialed connector switch and the call was handled in a normal fashion thereafter.

Thus, it is apparent that a conventional individual line has been converted into a hunting group on a non-hunting type of existing connector switch or a non-consecutive line has been added to a hunting group. Since the group directory number is not connected to a telephone line, a jump hunting group of $n$ lines occupies $n + 1$ terminals on the connector.

The functions to be performed by the respective boxes labeled 48, 54, 56, 58, 60, 80 nad 82 are all conventional to telephony and may be accomplished in more than one way. They may be accomplished, for instance, in ways known in telephony and described, for example, in "The Design of Switching Circuits," Keister, Ritchie and Washburn, published by Van Nostrand Company, Inc., or alternatively by means known to the computer industry and described in digital and linear circuits catalogs, for instance, that of Signetics Corporation, 1972.

Figure 4:
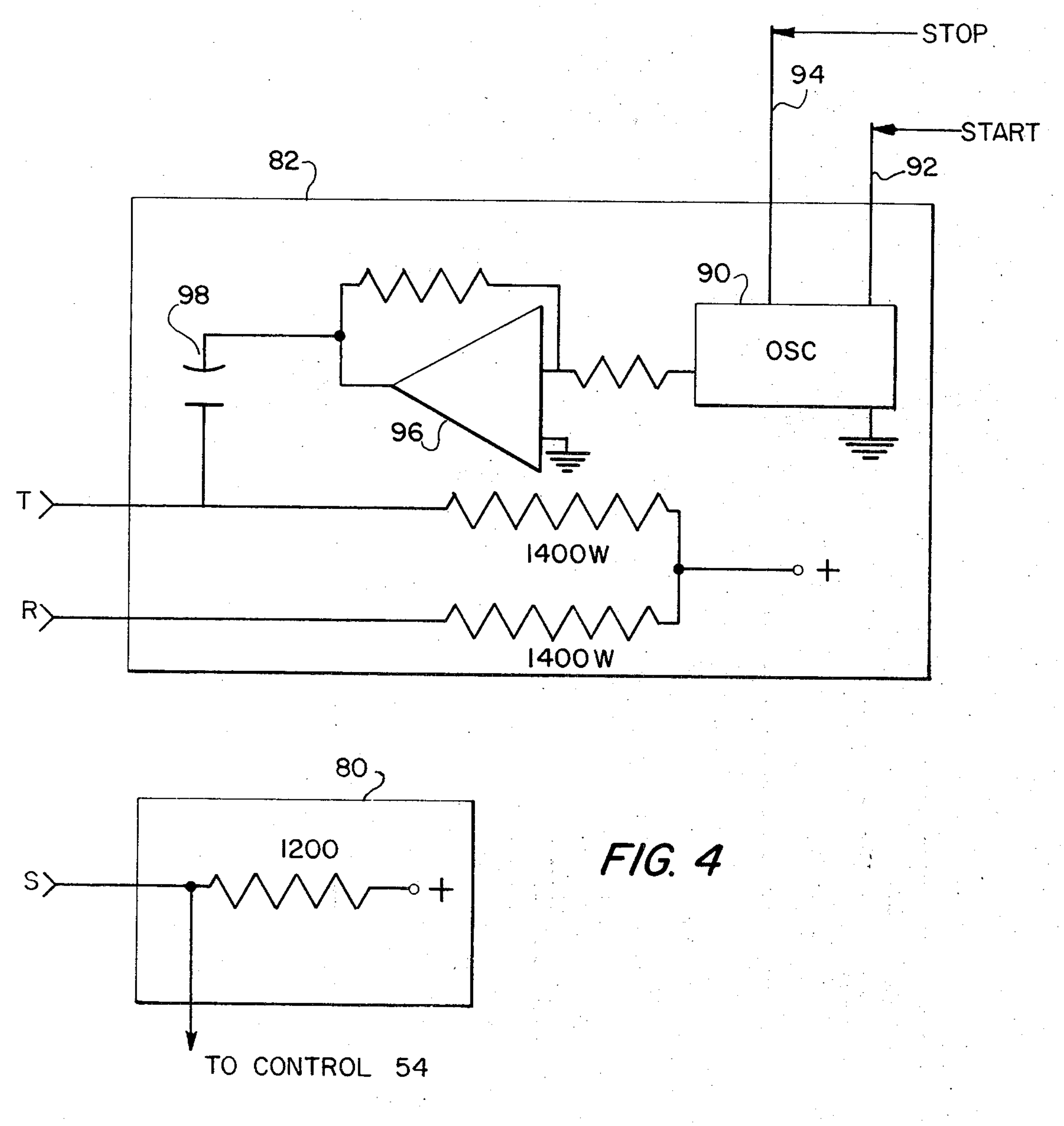
FIG. 4 shows an exemplary means for applying an a.c. signal to a directory number multiple and detecting the presence of a jump hunting call on the multiple.
Figure 6:
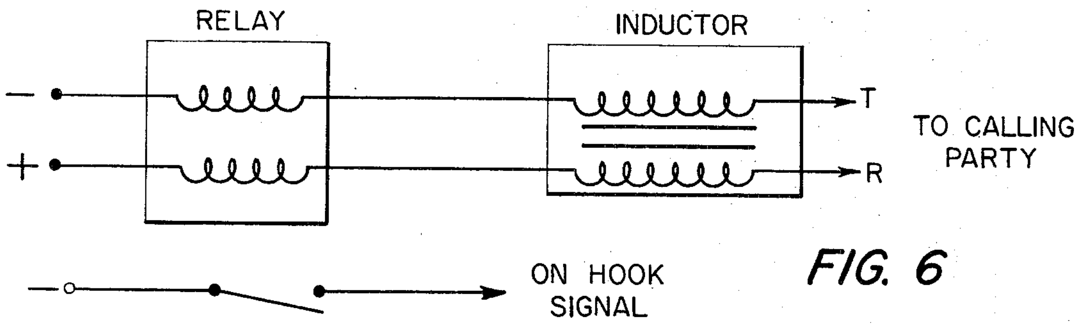
FIG. 6 shows one form of the circuit for supervising the calling line, and means for dropping the connection on abandoned calls.
Figure 5:
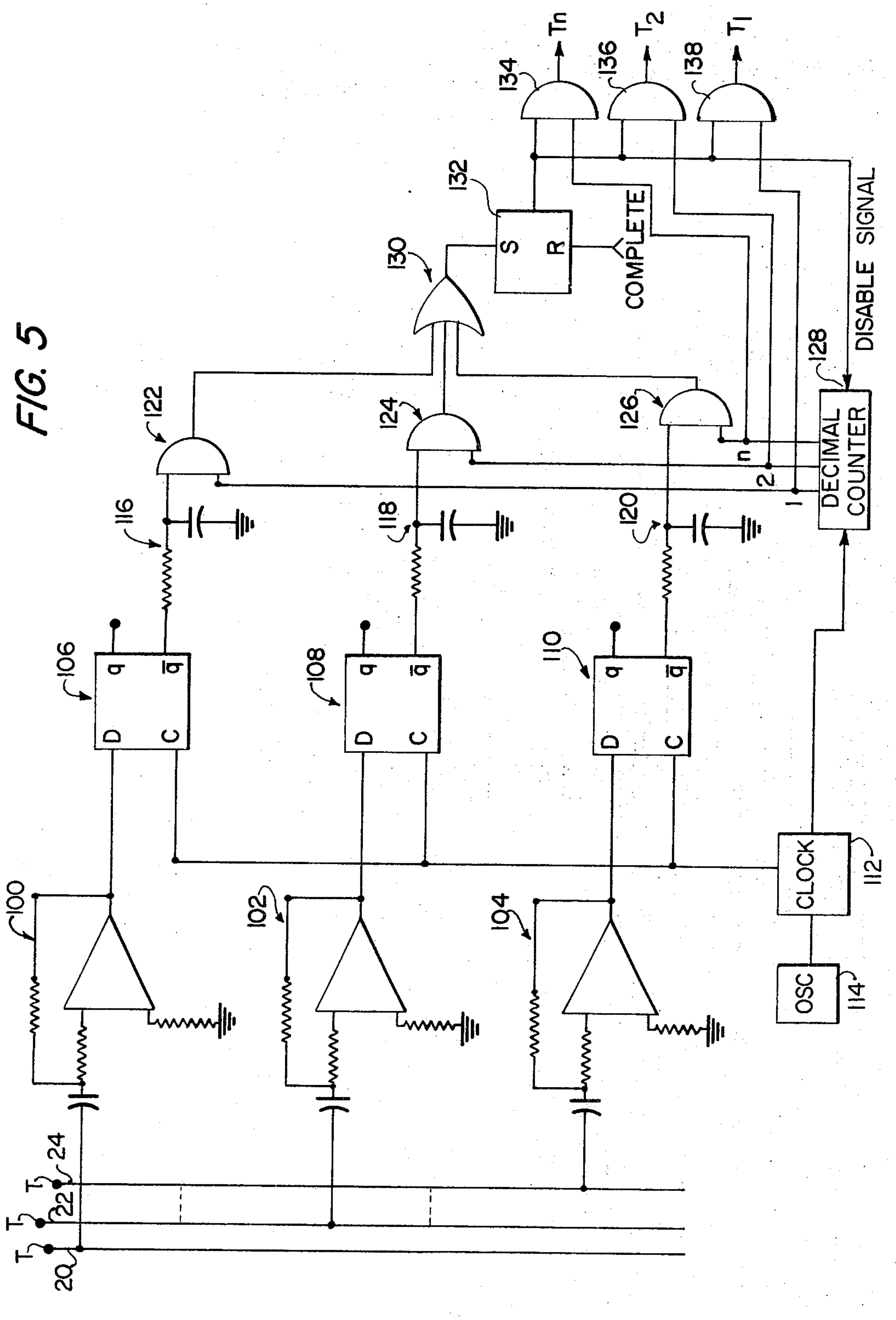
FIG. 5 depicts detailed circuits for one method of scanning connector inputs for an a.c. signal.

For greater ease in understanding, a number of specific examples of suitable circuitry has been shown in FIGS. 4, 5 and 6, and are described herein, without regard to the chronological order in which such circuits are used for setting up a jump hunting call, as discussed in FIG. 3.

BLOCKS 82 AND 80

The functions of blocks 82 and 80 are accomplished in a very simple way. In one embodiment, the tip and ring leads are connected to plus battery terminals through 1,400 ohm resistors, as shown in FIG. 4. This connection to plus battery is sufficient to trip ringing and will not operate the relay (not shown) in circuit 32 which initiates timing for charge information. In other embodiments, it may be necessary to switch the resistors off the tip and ring before the timing relay operates. The sleeve lead is connected to plus battery through 1,200 ohms. As shown in FIG. 4, a lead from the 1,200 ohms resistance to control circuit 54 gives an indication of current through the resistance and alerts the control when the connector provides the current path. When control circuit 54 receives the alert signal, it starts oscillator 90 by means of lead 92. The operation of any relay $T_i$ also causes the oscillator 90 to be turned off by means of lead 94. The output of oscillator 90 is amplified by operational amplifier 96 and applied to the tip lead through a capacitor 98 as an approximate square wave.

RE-DIALER 56

The function of this circuit is to generate two pulse trains corresponding respectively to two dial pulse strings suitable for operation of step-by-step switches separated from each other by a suitable inter-digital interval. This function is performed by a variation of a conventional dial pulse out-sender as widely used in No. 5 crossbar and fully explained in U.S. Pat. No. 2,585,904 issued to A. J. Busch, Feb. 19, 1952. No further description of block 56 is deemed necessary.

BUSY CIRCUIT 60

This circuit simply connects the sleeve lead of the directory number line to negative battery when and only when the sleeve leads of all the auxiliary lines indicate them to be busy. It also disables the start lead between block 80 and block 54.

SCAN CIRCUIT 48

Scanning of inputs 20, 22, and 24 may be accomplished in many ways. Relays may be used to connect a tone detector to each input in a sequential scan. A preferred form of the scanner is shown in FIG. 5.

The leads T/20, T/22 and T/24 are the tip leads of inputs 20, 22 and 24 of FIG. 3. There are operational amplifiers 100, 102 and 104 connected to these leads respectively through capacitances and high resistance values so as to have no effect on the audio frequency transmission of the telephone circuits. The d.c. outputs of the operational amplifiers are connected respectively to flip-flops 106, 108 and 110. The amplifiers are biased so that the outputs are at logic 1 when no inputs are present. The leads, c, of these flip-flops are connected to a clock 112 as shown in FIG. 5 which, in turn, is operated from oscillator 114, the output of which is essentially a square wave which is synchronized to the a.c. frequency applied to the tip of multiple 30 in FIG. 3, but 90° out of phase with the signal applied to this multiple. The outputs $\overline{q}$ of the flip-flops are the respective complements of the signals D which are all "1" if no frequency is present. The signal applied to the multiple appears on one of the leads T/20, T/22. T/24 and sets the output of the operational amplifier to logic "0" and logic "1" is gated to the output of the corresponding flip-flop by each clock pulse.

The outputs of flip-flops 106, 108 and 110 are connected respectively to integrators 116, 118 and 120 of FIG. 5. The output of the integrator receiving pulses of logic "1" will rise to d.c. logic "1". The outputs of the integrators are applied respective to "AND" circuits 122, 124 and 126, which "AND" circuits have inputs respectively from outputs of a decimal counter 128 shown in FIG. 5. The outputs of "AND" circuits 122, 124, and 126 are connected to "OR" circuit 130, the output of which has logic "1" when a signal is present on one of the leads T/20, T/22 T/24. Logic "1" out of 130 sets flip-flop 132 which locks itself into the state that applies logic "1" to the inputs of "AND" circuits 134, 136, and 138 and to the disable lead of decimal counter 128. Each of "AND" circuits 134, 136 and 138 have an input which is the output of one stage of decimal counter 128 as shown in FIG. 5.

Decimal counter 128 is connected so that it counts to n and then recycles. One and only one output is high in each state. The counter, driven by the clock, gates the "AND" circuits 122, 124 and 126 sequentially and repeatedly. This is the scanning process. When the information input of one of the "AND" circuits is logic 1, the output of the "OR" circuit 130 becomes 1 and flip-flop 132 is set and locked. The output of 130 indicates a frequency present and this signal stops counter 128 from continuing the count. In this state, one of the "AND" circuits 134, 136, and 138 has logic "1" on both inputs and hence its output becomes "". The "AND" circuits 134, 136, and 138 connect to relay drivers which in turn are connected to relays $T_1$, $T_2$, $T_n$, respectively, and logic 1 on an "AND" circuit operates the corresponding relay to transfer supervision of the calling line connection to control circuit 54 and connect the connector input to the re-dialer. This connection is locked by flip-flop 132 until the flip-flop is reset by a "complete" signal which is applied to flip-flop 132 when the re-dialing is complete. Release of the transfer relay restores the connector to normal and causes ringing of the called line to begin in the normal manner.

The above description also covers block 58 of FIG. 3, as well as block 48.

CONTROL CIRCUIT 54

Control circuit 54 performs the function of supervising the connection to the calling line and controlling the sequence of operations which make up the jump heating process in the present invention.

The supervisory circuit is simple and is used in a multiplicity of places in automatic telephony. It is shown in a preferred schematic form in FIG. 6. It consists of two parts, a relay and an audio frequency inductor. It feeds battery to the calling line through a balanced winding on the relay and a higher impedance balanced winding on the inductor.

The relay is a current sensor with a single make contact which holds the connection to the calling line as long as current flows in the line from the battery. If the calling line hangs up, the contact opens and releases the connection. It also discontinues the jump heating process and restores the system to the idle state.

The inductor provides an impedance through which the battery current is fed to the line without shunting the speech signals down to an excessive extent.

The remaining task of block 54 is the control of the sequence of operations. There are many ways in which this can be done such as that described in U.S. Pat. No. 2,585,904, A. J. Busch, these techniques being so well known that the remaining description is limited to a recapitulation of the sequence: 1) idle state searching sleeve lead of multiple for alert condition; 2) discontinue search; 3) trip ringing; 4) apply a. c. signal to multiple; 5) scan inputs for signal; 6) detect tone; (*a*)stop search, (*b*) identify connector and discontinue search, (*c*) operate transfer relay, (*d*) remove tone from multiple, (*e*) dial number of auxiliary line, (*f*) release relay and start search for alert signals.

With the above-described system, it is possible not only to effect "jump heating" from any one directory number on a connector to any other number on the connector, but it is further possible to utilize these "jump hunting" capabilities in conjunction with the currently existing consecutive hunting wired connector switch. In this instance, line 30 as described above would be selected as the last line within the existing consecutive hunting group, from which line "jump hunting" would be effected. Thus, with the present invention, not only can hunting service be provided to new customers on step-by-step systems, but customers currently enjoying the benefits of a small sequential hunting group can expand the hunting group to incorporate any other available line on the particular connector group.

The system set forth above has been described as incorporating an alert means 80 coupled to a single outgoing subscriber line from a connector group. As such, only one subscriber amongst the plurality of subscribers holding the subscriber lines on a particular connector group can be provided with this "jump hunting" service. To expand the capabilities of the instant invention system so as to accommodate additional "jump hunting" subscribers on a particular connector group, most of the inventive system can be time-shared and very little additional apparatus is required, thus reducing the average cost per hunting group.

For example, and as depicted in FIG. 3 of the drawings, an additional outgoing subscriber line such as line 66, and the illustrated auxiliary line sleeves 76 and 78 can form a second hunting group. Line 66 can be monitored by an additional detecting or alert means 68 provided with its own busy circuit 70 and its own load applying and signal generating circuit 72, all coupled to the single control means 54. Operation of the apparatus remains identical to that described above with respect to a call requiring jump hunting capabilities that might have occurred on subscriber line 30. In this instance the call requiring jump hunting service would appear on line 66 instead, which would be detected by alert means 68, and which would commence the previously-described operations. Thus, numerous subscribers can be provided jump hunting service with very little equipment additional to that required for the provision of "jump hunting" service to the first subscriber, control means 54 distinguishing which subscriber of the plurality of subscribers having jump hunting service received the call so that the re-dialer means 56 could redial the call to a suitable auxiliary line assigned to the particular subscriber. If the number of jump hunting groups provided within a connector group becomes large, additional re-dialers may be desirable so as to reduce delays when a number of calls are awaiting completion.

It should now be apparent that the objectives initially set forth at the outset of this specification have been successfully achieved. Moreover, while there has been shown a preferred embodiment of the instant invention, it should be appreciated that those skilled in the art can readily make modifications thereto within the scope of the invention as defined by the appended claims. Accordingly,

What is claimed is:

1. In a step-by-step telephone switching system wherein a call is progressively routed by dial pulses from an electro-mechanical line finder or an incoming trunk through selector stepping apparatus of an exchange into an electro-mechanical stepping switch of a connector group to which is multipled a group of subscriber lines, the position of the connector switch brush on said lines being determined by the dial pulses to effect a connection between the calling line and the line of the called subscriber, the improvement comprising: means for detecting the presence of a call; means for identifying the connector switch of the group through which the call is being switched; means for intercepting the call at the identified connector switch input and restoring the switch to normal; re-dialer means for automatically generating dial pulses representative of a different subscriber line of the group on said connector switch; and means for thereafter connecting the calling line to the different subscriber line through said connector switch.

2. The improvement defined in claim 1, further including control means for detecting the availability of respective subscriber lines of a plurality of different subscriber lines of the group of lines multiplied to the connector, and for selecting one of said plurality of different subscriber lines upon detection of the presence of an incoming call by said detecting means, said control means being coupled to said re-dialing means, said means for re-dialing thereby re-dialing the connector switch to move the connector switch brush to a position representative of said selected one of said plurality of different subscriber lines.

3. The improvement defined in claim 2, wherein said given plurality of different subscriber lines includes lines with non-consecutive numbers, and numbers not consecutive to the directory number dialed.

4. The improvement defined in claim 2, wherein said detecting means is coupled to said connector switch to detect the presence of an incoming call directed to the last subscriber line within a hunting group of subscriber lines of the group of lines served by said connector switch.

5. The improvement defined in claim 2, further including means for marking the line of the directory number busy if all subscriber lines of said given plurality of different subscriber lines of the group of lines unavailable.

6. The improvement defined in claim 2, wherein second detector means are provided for detecting the presence of an incoming call directed to a second given subscriber line of the group of lines on the connector switch, and wherein said control means further detects the availability of respective subscriber lines of a second given plurality of subscriber lines of the group of lines served by the connector and selects one of said second plurality of different subscriber lines upon detection of the presence of an incoming call directed to said second given directory number, said means for re-dialing thereby re-dialing the connector switch to move the connector switch brush to a position representative of said selected one of said second plurality of different subscriber lines.

7. In a step-by-step telephone switching system wherein an incoming call is progressively routed by dial pulses from an electro-mechanical line finder or an incoming trunk through selector stepping apparatus of an exchange into one switch of a connector group to which is multipled a group of subscriber lines, the position of the connector switch brush on said line terminal bank being determined by the dial pulses and a hunting process to effect a connection between a calling line or trunk and the last line of the called subscriber group, the improvement enabling an expansion of the hunting capabilities of the connector, said improvement comprising: means for detecting the presence of a call directed to a given directory number group of the lines on the connector switch; means for identifying the switch of the connector on which the call appears; means for disconnecting the calling line or trunk from the identified connector switch while holding the calling connection and restoring the connector switch to normal; means for re-dialing the connector switch to move the connector switch brush to a position representative of a selected predetermined different subscriber line of the group of lines; and means for reconnecting the calling line or trunk to the repositioned connector switch.

8. The improvement defined in claim 7, further including control means for detecting the availability of respective subscriber lines of a plurality of different subscriber lines of the group of lines multipled to the connector, and for selecting one of said plurality of different subscriber lines upon detection of the presence of an incoming call by said detecting means, said control means being coupled to said re-dialing means, said means for re-dialing thereby re-dialing the connector switch to move the connector switch brush to a position representative of said selected one of said plurality of different subscriber lines.

9. The improvement defined in claim 8, wherein said given plurality of different subscriber lines includes lines with non-consecutive numbers, and numbers not consecutive to the directory number dialed.

10. The improvement defined in claim 8, wherein said detecting means is coupled to said connector switch to detect the presence of an incoming call directed to the last subscriber line within a hunting group of subscriber lines served by said connector switch.

11. The improvement defined in claim 8, further including means for marking the number busy if all subscriber lines of said given plurality of different subscriber lines of the group of lines are unavailable.

12. The improvement defined in claim 8, wherein second detector means are provided for detecting the presence of an incoming call directed to a second given directory number of the group of lines at the connector switch, and wherein said control means further detects the availability of respective subscriber lines of a second given plurality of subscriber lines of the group of lines served by the connector and selects one of said second plurality of different subscriber lines upon detection of the presence of an incoming call directed to said given directory number, said means for re-dialing thereby re-dialing the connector switch to move the connector switch brush to a position representative of said selected one of said second plurality of different subscriber lines.

13. A method of increasing the hunting capabilities of an electro-mechanical connector in a step-by-step telephone switching system wherein an incoming call is progressively routed by dial pulses from an electro-mechanical line finder or incoming trunk through selector stepping apparatus of an exchange into the electro-mechanical connector to which is multipled a group of subscriber lines, the position of the connector switch brush on the line terminal bank being determined by the dial pulses to effect a connection between the calling line or trunk and the line of the called subscriber, and wherein the connector is wired to effect hunting of successive subscriber lines within a sub-group of the group of lines in the event the called subscriber line is busy, said method comprising the steps of: detecting the presence of an incoming call directed to a given subscriber line of the group of lines at the connector; identifying the connector switch of the group on which the call appears; disconnecting the incoming call from the identified connector switch while holding the calling line or trunk; re-dialing the connector switch to move the connector switch brush to a position representative of a selected predetermined subscriber line of a different block of lines; and re-connecting the incoming call to the redialed connector switch.

* * * * *